(12) United States Patent
Murakami et al.

(10) Patent No.: US 7,734,393 B2
(45) Date of Patent: Jun. 8, 2010

(54) OBJECT STRUCK DISCRIMINATION SYSTEM AND PROTECTION SYSTEM

(75) Inventors: Daisuke Murakami, Shiga (JP); Hiroshi Aoki, Ritto (JP)

(73) Assignee: Takata Corporation, Tokyo (JP)

( * ) Notice: Subject to any disclaimer, the term of this patent is extended or adjusted under 35 U.S.C. 154(b) by 863 days.

(21) Appl. No.: 11/217,990

(22) Filed: Sep. 1, 2005

(65) Prior Publication Data

US 2006/0064219 A1  Mar. 23, 2006

(30) Foreign Application Priority Data

Sep. 21, 2004  (JP) .............................. 2004-273436

(51) Int. Cl.
*B60R 21/00*  (2006.01)
(52) U.S. Cl. .............................. 701/45; 701/46; 701/47; 293/120; 293/121; 296/187.04
(58) Field of Classification Search ............ 701/45–47; 293/120–121; 296/187.04
See application file for complete search history.

(56) References Cited

U.S. PATENT DOCUMENTS

| | | | |
|---|---|---|---|
| 6,212,456 B1 * | 4/2001 | Stride ........................... | 701/45 |
| 6,510,914 B2 * | 1/2003 | Ishizaki et al. .............. | 180/274 |
| 6,516,278 B1 | 2/2003 | Ishizaki et al. | |
| 6,561,301 B1 | 5/2003 | Hattori et al. | |
| 6,728,613 B2 | 4/2004 | Ishizaki et al. | |
| 6,784,792 B2 * | 8/2004 | Mattes et al. ................ | 340/436 |
| 6,832,145 B2 * | 12/2004 | Takafuji et al. ............... | 701/45 |
| 6,882,916 B2 * | 4/2005 | Takafuji et al. ............... | 701/45 |
| 2002/0180596 A1 | 12/2002 | Mattes et al. | |
| 2004/0002815 A1 | 1/2004 | Ishizaki et al. | |
| 2004/0011582 A1 | 1/2004 | Aoki | |
| 2004/0020701 A1 | 2/2004 | Aoki | |
| 2004/0210367 A1 * | 10/2004 | Takafuji et al. ............... | 701/45 |
| 2005/0012312 A1 | 1/2005 | Roelleke | |
| 2005/0096815 A1 * | 5/2005 | Takafuji et al. ............... | 701/45 |

FOREIGN PATENT DOCUMENTS

| | | |
|---|---|---|
| GB | 2376118 | 12/2002 |
| JP | 08-230610 A | 9/1996 |
| JP | 2004-196239 A | 7/2004 |

OTHER PUBLICATIONS

Wood et al.; Velocity Changes, Mean Accelerations and Displacements of Some Car Types in Frontal Collisions; International Journal of Crashworthiness; vol. 8, No. 6; pp. 591-603.*

* cited by examiner

*Primary Examiner*—Khoi Tran
*Assistant Examiner*—Nikhil Sriraman
(74) *Attorney, Agent, or Firm*—Fitch, Even, Tabin & Flannery

(57) ABSTRACT

An object struck discrimination system for a vehicle is provided which is effective in increasing the discrimination accuracy for discriminating an object struck by the vehicle. In one form, an object struck discrimination system to be installed in a vehicle includes an impact receiving member for receiving an impact from an object struck which extends lengthwise along the width of the vehicle, a detection sensor for detecting the moving speed and/or the acceleration of the impact receiving member during a vehicle collision, and a control unit for deriving the maximum moving speed and the maximum acceleration based on the information detected by the detection sensor and discriminating the object struck based on the correlation between the maximum moving speed and the maximum acceleration.

5 Claims, 11 Drawing Sheets

OBJECT STRUCK DISCRIMINATION SYSTEM AND PROTECTION SYSTEM

FIELD OF THE INVENTION

The present invention relates to a technology for discriminating an object struck by a vehicle such as an automobile.

BACKGROUND OF THE INVENTION

Conventionally, various techniques for discriminating whether an object struck by a vehicle is a pedestrian or not have been proposed. For example, disclosed in Japanese Patent Unexamined Publication No. H10-194158 is an object struck discrimination system for discriminating an object struck based on the speed of a vehicle and the acceleration in the forward and rearward directions acting on the vehicle. In such object struck discrimination systems, it is highly demanded to develop a technology for increasing the discrimination accuracy for discriminating an object struck to ensure the protection of a vehicle occupant and/or a pedestrian during a vehicle collision.

SUMMARY OF THE INVENTION

The present invention has been made in view of the above demand and it is an object of the present invention to develop an object struck discrimination system for a vehicle which is effective to increase the discrimination accuracy for discriminating an object struck by the vehicle.

For achieving the object, the present invention is configured. The present invention can be adopted to a technology for discriminating an object struck during a vehicle collision for a wide variety of vehicles such as automobile, train, boat and ship.

The first form of the present invention for achieving the aforementioned object is an object struck discrimination system for discriminating an object struck by a vehicle. The object struck discrimination system described in this form is a system to be installed in a vehicle and comprises at least an impact receiving portion, a detection means, a first derivation means, a second derivation means, and an object struck discrimination means.

The impact receiving portion of this invention extends lengthwise along the vehicle width at a front side or a rear side of a vehicle and has a function of receiving an impact from an object struck. Specific examples of this impact receiving portion include a front bumper cover or a rear bumper cover having low rigidity which is disposed on an outer peripheral portion of the vehicle, and an impact receiving member having high rigidity which is disposed between the bumper cover and a bumper frame. The impact receiving portion moves toward the inside of the vehicle while being deformed by the impact during the vehicle collision. Therefore, the moving speed of the impact receiving portion corresponds to the deformation speed of the impact receiving portion.

The detection means of this invention is a means having a function of detecting at least one of the moving speeds and the acceleration of the impact receiving portion during a vehicle collision. That is, examples of the detection means include a structure for detecting the moving speed or the acceleration and a structure for detecting both the moving speed and the acceleration. Typically, the detection means is composed of a speed detection sensor and/or an acceleration detection sensor attached to the impact receiving portion. By the detection means, at least one of the moving speeds and the acceleration of the impact receiving portion which moves toward the inside of the vehicle while being deformed during the vehicle collision is detected. It should be noted that the "acceleration" used here means not only the acceleration itself but also the rate-of-change in speed per unit time obtained based on the moving speed.

The first derivation means of this invention is a means having a function of deriving the maximum moving speed of the impact receiving portion based on the information detected by the detection means. Typically, the first derivation means is composed of a processing unit for conducting arithmetic processing based on signals from a speed detection sensor. By the first derivation means, the maximum moving speed of the impact receiving portion during a vehicle collision is derived. The "maximum moving speed" may be derived from the moving speed detected by the speed detection sensor as the detection means or derived from the moving speed obtained by integrating the acceleration detected by an acceleration detection sensor as the detection means.

The second derivation means of this invention is a means having a function of deriving the maximum acceleration of the impact receiving portion based on the information detected by the detection means. Typically, the second derivation means is composed of a processing unit for conducting arithmetic processing based on signals from an acceleration detection sensor as the detection means. By the second derivation means, the maximum acceleration of the impact receiving portion during a vehicle collision is derived. The "maximum acceleration" used here includes not only the maximum value of acceleration but also the maximum value of rate-of-change in speed per unit time obtained based on the moving speed. The maximum acceleration may be derived from rate-of-change in the moving speed per unit time which is obtained by differentiating the moving speed detected by a speed detection sensor as the detection means or derived from the acceleration detected by an acceleration detection sensor as the detection means.

The object struck discrimination means of this invention is a means having a function of discriminating the object struck based on the correlation between the maximum moving speed derived by the first derivation means and the maximum acceleration derived by the second derivation means. By the object struck discrimination means, it is possible to discriminate whether the object struck is, for example, a person (a pedestrian) or a thing (a guardrail, an electric pole, or a vehicle). As a specific example of the mode of "discriminating an object struck", a mode of discriminating whether the object struck is a person (a pedestrian) or not based on the correlation between the maximum moving speed and the maximum acceleration of the impact receiving portion can be employed. In this case, it is structured to determine that the object struck is something other than person when it is discriminated that the object struck is not a person. That is, actual discrimination of the object struck is conducted according to the discrimination of whether the object struck is a person or not.

Generally, when a vehicle collides with an object struck, abnormal acceleration which is never generated during normal driving is generated. For example, when the vehicle strikes a person, the maximum moving speed and the maximum acceleration of the impact receiving portion should be smaller than those in case of a fixed thing or a heavy thing because the mass of the person is significantly smaller than that of the fixed thing such as a guardrail or the heavy thing. In this case, as for the correlation between the maximum moving speed and the maximum acceleration of the impact receiving portion, there is a marked difference between a case that the object struck is a person and a case that the object struck is a thing. Therefore, in the present invention, it is structured to discriminate the object struck based on the correlation between the maximum moving speed and the maximum acceleration of the impact receiving portion among the respective parts of the vehicle, wherein the impact receiving portion receives directly the impact during the vehicle collision at its wide area along the vehicle width. It is preferable to takes the following structure for discriminating the object struck. That is, a vehicle collision test with a predetermined article as an object struck or a vehicle collision simulation on the assumption of a situation with a person is conducted. Data about the correlation between the maximum moving speed and the maximum acceleration of the impact receiving portion in the vehicle collision test or the vehicle collision simulation is set and stored. This data is used to be compared to the correlation between the maximum moving speed and the maximum acceleration of the impact receiving portion detected during an actual vehicle collision, thereby discriminating the object struck. According to this structure, the object struck is discriminated based on the behavior of the impact receiving portion during the vehicle collision so that the discrimination accuracy for discriminating the object struck can be increased regardless of the position striking the object on the impact receiving portion.

The second form of the present invention for achieving the aforementioned object is an object struck discrimination system for discriminating an object struck by a vehicle. In the object struck discrimination system described in this form, the object struck discrimination means described previously is adapted to discriminate the object struck as a person when the correlation between the maximum moving speed derived by said first derivation means and the maximum acceleration derived by said second derivation means is in a reference region. The reference region may be set by using data relating the correlation between the maximum moving speed and the maximum acceleration of the impact receiving portion obtained by the vehicle collision test conducted with an imitated human body as an object struck or collision simulation conducted on the assumption of a situation with a person. Alternatively, the reference region may be set by using data relating the correlation between the maximum moving speed and the maximum acceleration of the impact receiving portion obtained from information from something other than the vehicle collision test. By comparing the data to the correlation between the maximum moving speed and the maximum acceleration of the impact receiving portion detected in an actual vehicle collision, it can be discriminated that the object struck is a person. This structure can increase the discrimination accuracy for discriminating that the object struck is a person. The result of the discrimination can be used for controlling the protection for a person (pedestrian).

The third form of the present invention for achieving the aforementioned object is an object struck discrimination system. In the object struck discrimination system described in this form, the reference region described previously is set based on the correlation between the maximum moving speed and the maximum acceleration of an imitated human body (that is, a doll known as "dummy") or a person during a vehicle collision in a vehicle collision test previously conducted with the imitated human body or a collision simulation on the assumption of a situation with the person. When the correlation between the maximum moving speed and the maximum acceleration of the impact receiving portion detected during an actual vehicle collision is in the reference region obtained by the vehicle collision test or the collision simulation previously conducted, the object struck is discriminated as a person. This structure can increase the reliability of discriminating that the object struck is a person.

The fourth form of the present invention for achieving the aforementioned object is an object struck discrimination system. In the object struck discrimination system described in the form, the reference region described previously is set based on a time period elapsing from the occurrence of the vehicle collision to a time at which the acceleration acting on the imitated human body becomes the maximum in addition to the correlation between the maximum moving speed and the maximum acceleration of the imitated human body. This structure increases the discrimination accuracy of discriminating that the object struck is a person and increases the reliability.

The fifth from of the present invention for achieving the aforementioned object is an object struck discrimination system. In the object struck discrimination system described in this form, the impact receiving portion described previously is composed of an impact receiving member having high rigidity which extends lengthwise along the vehicle width. According to this structure, since the impact received by the impact receiving member having high rigidity during the vehicle collision acts substantially uniformly on the entire impact receiving member, the discrimination accuracy for discriminating the object struck can be increased regardless of the position striking the object on the impact receiving portion extending in the vehicle width direction.

The sixth form of the present invention for achieving the aforementioned object is an object struck discrimination system. In the object struck discrimination system described in this form, the impact receiving portion described previously has an absorbing member to extend outward beyond the impact receiving member. This structure includes an embodiment in which an absorbing member is provided on a front side beyond the impact receiving member when the impact receiving portion is arranged on the front side of the vehicle and an embodiment in which an absorbing member is provided on a rear side beyond the impact receiving member when the impact receiving portion is arranged on the rear side of the vehicle. By the absorbing member, the impact to be received by the vehicle is dispersed so as to act substantially uniformly on the entire impact receiving member. Therefore, the vehicle collision can securely reflect to the behavior of the impact receiving member, thereby further increasing the discrimination accuracy for discriminating the object struck.

The seventh form of the present invention for achieving the aforementioned object is a protection system. The protection system described in this form is systems which are actuated in the event of a vehicle collision to protect a vehicle occupant and/or a pedestrian to ensure the safety of the vehicle occupant and/or the pedestrian. In this form, the protection system is actuated according to the result of discrimination of an object struck by an object struck discrimination system as previously has been described. For example, when it is determined that the object struck is a person (pedestrian), the protection system is actuated to protect the occupant and the pedestrian. The "protection system" includes airbag devices installed in a steering wheel in front of a driver's seat, an instrument panel in front of a passenger's seat, a door trim, a seat, and/or a pillar, and a pretensioner for applying predetermined tension to a seat belt for the purpose of protecting vehicle occupants, and a device for lifting a vehicle hood upward, a device of making a protection pad member or an airbag to act on a pedestrian, and the like for the purpose of protecting the pedestrian.

According to the aforementioned structure, the protection system is actuated with high discrimination accuracy for discriminating an object struck at the event of a vehicle collision, thereby providing thorough protection of the person and the pedestrian.

As described in the above, the present invention can achieve an effective technique of increasing the discrimination accuracy for discriminating an object struck by a structure of discriminating an object struck based on the correlation between the maximum moving speed and the maximum acceleration during a vehicle collision of an impact receiving portion which extends lengthwise along the vehicle width at the front side or the rear side of the vehicle.

DETAILED DESCRIPTION OF THE PREFERRED EMBODIMENTS

Hereinafter, embodiments of the present invention will be described with reference to drawings. First, description will be made as regard to an object struck discrimination system 100 as an embodiment of the "object struck discrimination system" according to the present invention with reference to FIG. 1 and FIG. 2. It should be noted that this embodiment is an object struck discrimination system 100 to be installed in a vehicle 101 of an automobile.

Figure 1:
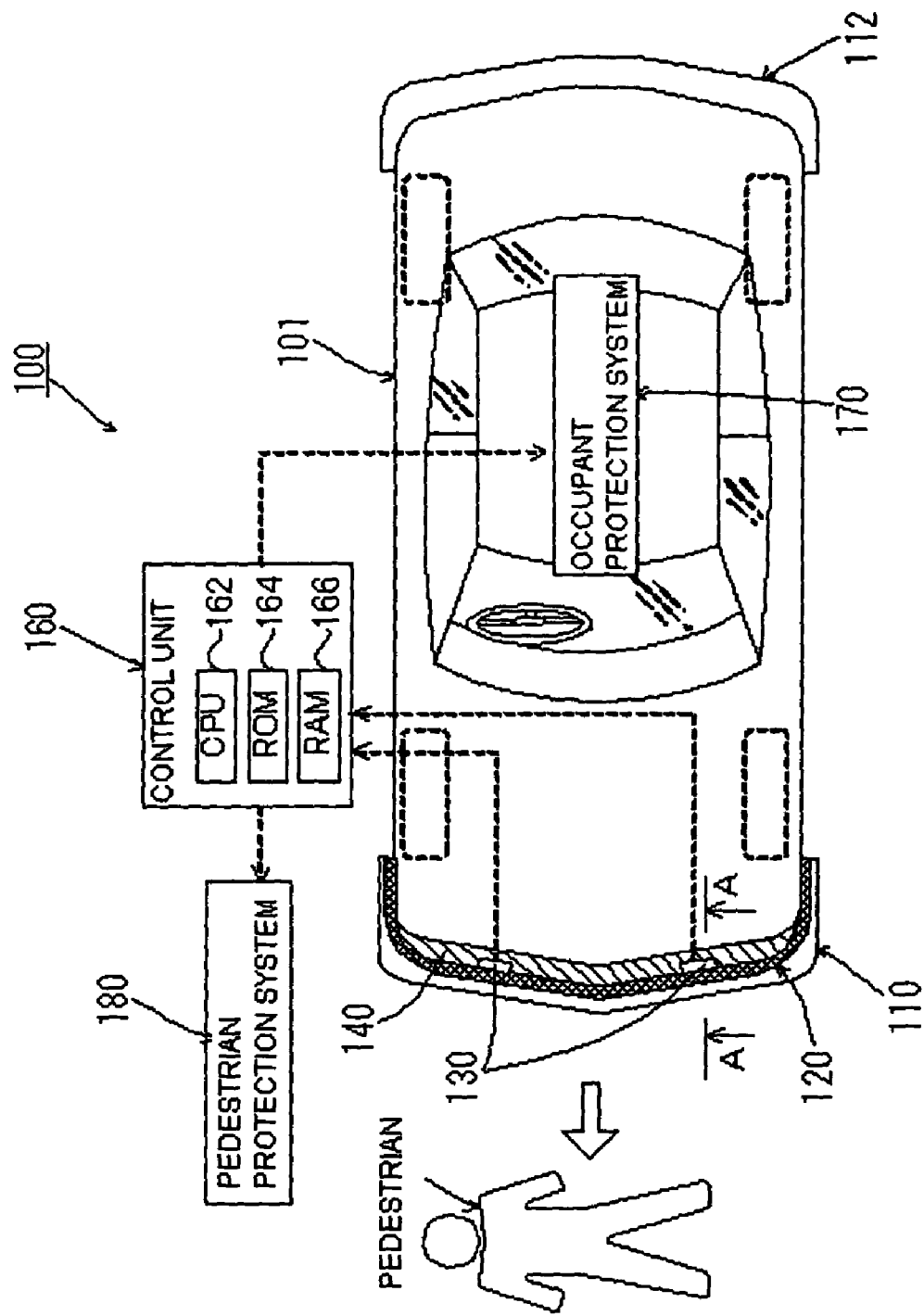
FIG. 1 shows a schematic structure of an object struck discrimination system of an embodiment according to the present invention.

The schematic structure of the object struck discrimination system 100 of the embodiment according to the present invention is shown in FIG. 1. The sectional structure taken along a line A-A of the vehicle 101 in FIG. 1 is shown in FIG. 2.

The vehicle 101 shown in FIG. 1 comprises a front bumper 110, a rear bumper 112, an impact receiving member 120, a detection sensor 130, a first absorbing member 140, a second absorbing member 150, a control unit 160, an occupant protection system 170, and a pedestrian protection system 180, and the like. In this embodiment, the object struck discrimination system 100 is mainly composed of the impact receiving member 120, the detection sensor 130, and the control unit 160.

Figure 2:
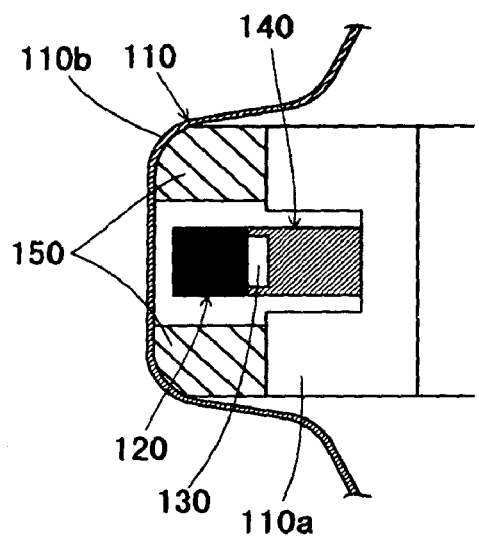
FIG. 2 shows a sectional structure taken along a line A-A of a vehicle in FIG. 1.

As shown in FIG. 2, the front bumper 110 comprises a bumper frame 110a and a bumper cover 110b made of resin covering a front side of the bumper frame 110a. In an area defined by the bumper frame 110a and the bumper cover 110b, the impact receiving member 120, the detection sensor 130, the first absorbing member 140, and the second absorbing member 150 are disposed.

The impact receiving member 120 is a member having a high rigidity extending lengthwise along the front bumper 110. The impact receiving member 120 composes the "impact receiving portion" or the "impact receiving member" of the present invention. The first absorbing member 140 is a member having a low rigidity which is disposed on a rear side of the impact receiving member 120 to absorb impact acting on the impact receiving member 120 during a vehicle collision. The detection sensor 130 is a sensor which is disposed between the impact receiving member 120 and the first absorbing member 140 and at a rear side of the impact receiving member 120 and has a function of detecting information about action such as the moving speed or acceleration of the impact receiving member 120 during a vehicle collision. The detection sensor 130 is a detection means for detecting the moving speed and acceleration and composes the "detection means" of the present invention. The second absorbing member 150 is a member having a low rigidity which is disposed between the bumper cover 110b and the bumper frame 110a to extend frontward beyond the impact receiving member 120 to absorb the impact acting on the front bumper 110 during a vehicle collision. The second absorbing member 150 composes the "absorbing member" of the present invention.

Reverting to FIG. 1, the control unit 160 comprises a CPU (processing unit) 162 of a known structure, a ROM 164, a RAM 166, and the like and has a function of carrying out respective arithmetic processing and storing processing based on information detected by the detection sensor 130 and a function of outputting control signals to an occupant protection system 170 and a pedestrian protection system 180. In addition, as will be described later in detail, the control unit 160 is a means having a function of deriving the maximum moving speed and the maximum acceleration of the impact receiving member 120 based on the information detected by the detection sensor 130 and a function of discriminating an object struck. The control unit 160 composes the "first derivation means", the "second derivation means", and the "object struck discriminating means" of the present invention.

The occupant protection system 170 is a system having a function of protecting a vehicle occupant during a vehicle collision and may be composed of airbag devices installed in a steering wheel in front of a driver's seat, an instrument panel in front of a passenger's seat, a door trim, a seat, and/or a pillar, and a pretensioner for applying predetermined tension to a seat belt. The control unit 160 controls the actuation of the occupant protection system 170 in such a manner as to achieve occupant protection by the airbag devices during a vehicle collision. The pedestrian protection system 180 is a system having a function of protecting a pedestrian during a vehicle collision and may be composed of a pedestrian protection member which moves toward a pedestrian protection region and the like. As an example, a structure for lifting a vehicle hood as the pedestrian protection member upward when a vehicle strikes a pedestrian or a structure for making a protection pad member as the pedestrian protection member to act on a pedestrian when a vehicle strikes the pedestrian may be employed to absorb the impact on the pedestrian.

Figure 3:
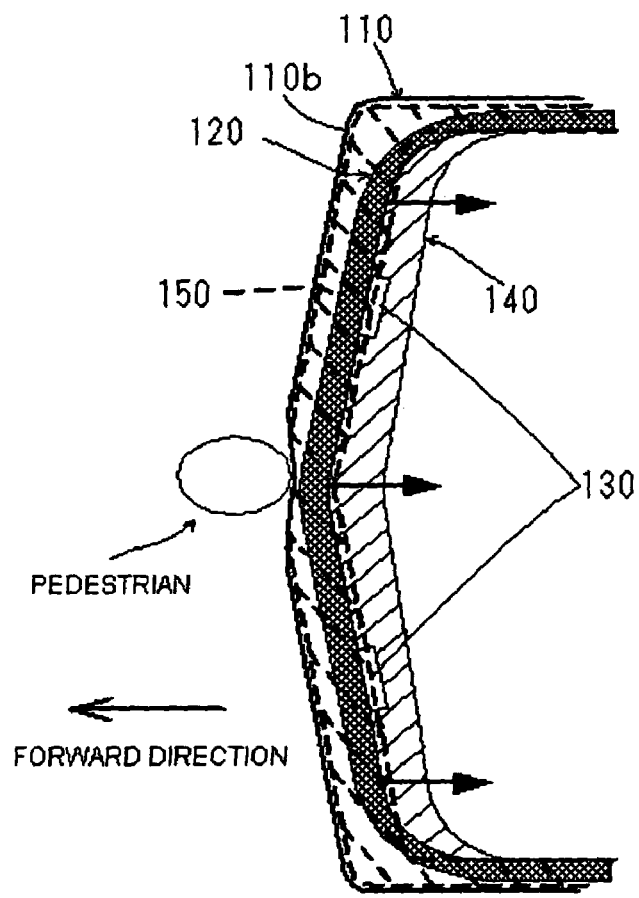
FIG. 3 shows a state of the vehicle when one of legs of a pedestrian is struck by a front bumper.
Figure 4:
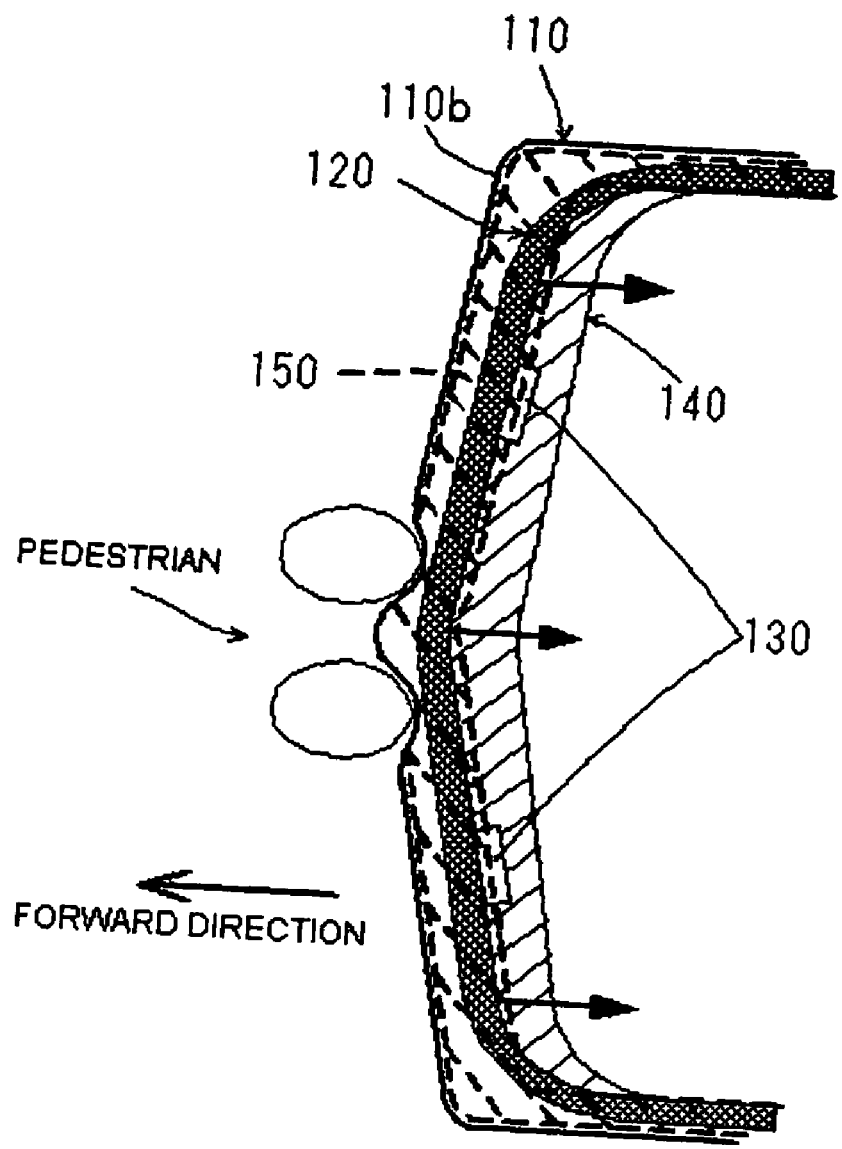
FIG. 4 shows a state of the vehicle when both legs of a pedestrian are struck by with the front bumper.

The action of the vehicle 101 during a vehicle collision will now be described with reference to FIG. 3 and FIG. 4. FIG. 3 shows a state of the vehicle when one of legs of a pedestrian is struck by the front bumper 110 and FIG. 4 shows a state of the vehicle when both legs of a pedestrian are struck by the front bumper 110.

It is assumed that one or both of legs of a pedestrian is struck by a central portion—as seen in the lateral direction— of the front bumper 110. In this case, as shown in FIG. 3 and FIG. 4, the bumper cover 110b of the front bumper 110 is deformed by striking the leg or legs of the pedestrian and the second absorbing member 150 is deformed with absorbing the impact. The impact is dispersed by the second absorbing member 150 so as to act substantially uniformly on the entire impact receiving member 120. The impact receiving member 120 moves in parallel in a direction of arrows in FIG. 3 and FIG. 4 to have similar behavior in both cases of FIG. 3 and the FIG. 4. According to the structure, the behavior of the impact receiving member 120 becomes similar regardless of the position striking the object on the bumper cover 110b. In this embodiment, the behavior of the impact receiving member 120 is stabilized by the second absorbing member 150 having low rigidity disposed between the bumper cover 110b and the bumper frame 110a.

Hereinafter, "control during vehicle collision" during the vehicle collision will be described with reference to FIG. 5 through FIG. 11. The "control during vehicle collision" of this embodiment is conducted by the control unit 160 having the aforementioned structure.

Figure 5:
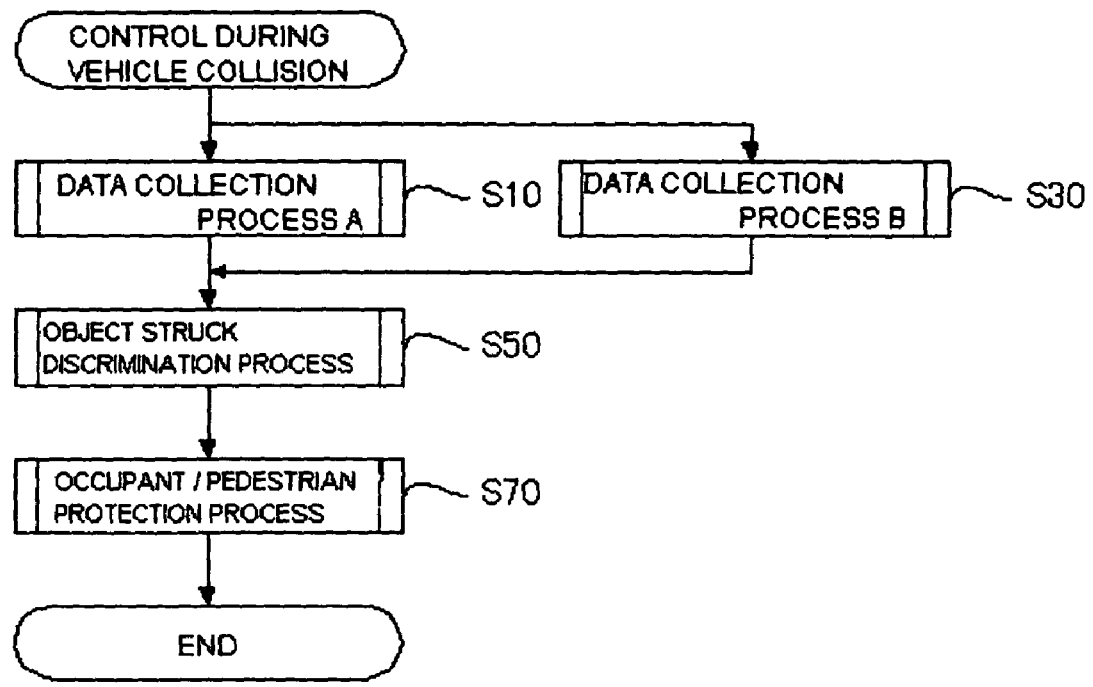
FIG. 5 is a flow chart of "control during vehicle collision".

FIG. 5 shows a flow chart of the "control during vehicle collision". The "control during vehicle collision" of this embodiment is carried out by sequentially conducting the respective steps of the flow chart shown in FIG. 5.

First, in "data collection process A" as designated by Step S10 in FIG. 5 or "data collection process B as designated by Step S30 in FIG. 5, data are collected in a vehicle collision test previously conducted. These two data collection processes may be both carried out or only one of them may be carried out in the vehicle collision test. Then, in "object struck discrimination process" as designated by Step S50 in FIG. 5, data during actual vehicle collision are compared to the data collected in Step S10 and/or Step 30 so as to discriminate an object struck. In "occupant/pedestrian protection process" as designated by step 70 in FIG. 5, an occupant and/or a pedestrian are protected based on the result of the discrimination in Step S50.

Figure 6:
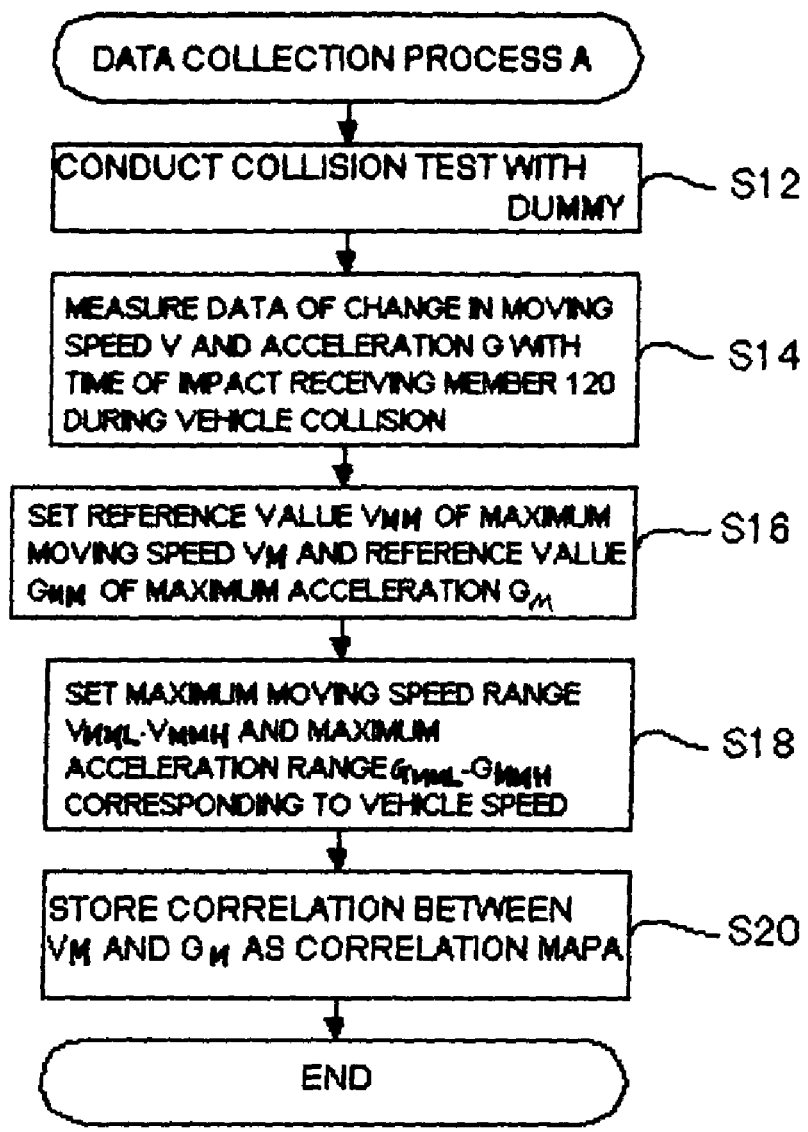
FIG. 6 is a flow chart of "data collection process A" in FIG. 5.

Specifically, the "data collection process A" as designated by Step S10 in FIG. 5 is carried out by sequentially conducting the respective steps (Steps S12 through 20) of the flow chart shown in FIG. 6.

First, by Step S12 in FIG. 6, a vehicle collision test is conducted. In the vehicle collision test, a dummy which is an imitation of a human is used as the object struck and a vehicle which is an imitation of the vehicle 101 having the structure shown in FIG. 1 is used so as to conduct the test by bringing the vehicle into collision with the dummy. The dummy corresponds to the "imitated human body" of the present invention. Next, by Step S14 in FIG. 6, data of change in moving speed V and acceleration G with time of the impact receiving member 120 during the vehicle collision are measured. Instead of the acceleration G, the rate-of-change in moving speed V per unit time may be employed. Then, by Step 16 in FIG. 6, a maximum moving speed $V_M$ of the dummy in the vehicle collision test is obtained and a reference value $V_{MM}$ is set based on the maximum moving speed $V_M$, while a maximum acceleration $G_M$ of the dummy in the vehicle collision test is obtained and a reference value $G_{MM}$ is set based on the maximum acceleration $G_M$. By Step 18 in FIG. 6, a maximum moving speed range ($V_{MML}$-$V_{MMH}$) and a maximum acceleration range ($G_{MML}$-$G_{MMH}$) corresponding to the vehicle speed are set. The maximum moving speed range ($V_{MML}$-$V_{MMH}$) and the maximum acceleration range ($G_{MML}$-$G_{MMH}$) are specifically set according to the structure, physical property, and individual difference of the impact receiving member 120. By step 20 in FIG. 6, a correlation map A indicating the correlation between the maximum moving speed $V_M$ and the maximum acceleration $G_M$ is obtained based on the respective collected data set in the aforementioned Steps 16 through S18 and is stored.

Figure 10:
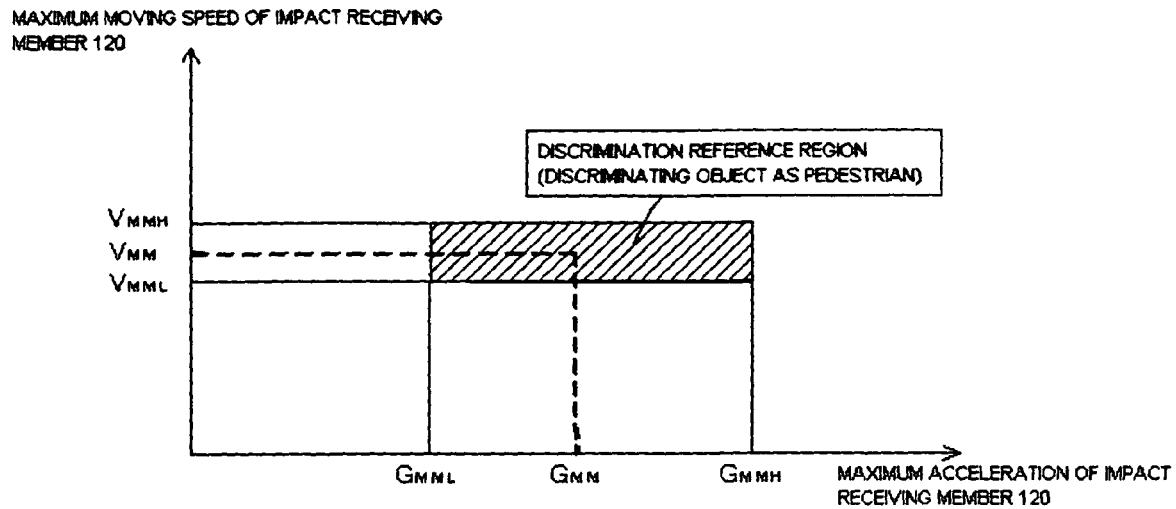
FIG. 10 shows a correlation map A obtained in the "data collection process A".

FIG. 10 shows an example of the correlation map A obtained and stored in the aforementioned Step 20. As shown in FIG. 10, in this embodiment, a region (hatched region in FIG. 10) defined by the maximum moving speed range ($V_{MML}$-$V_{MMH}$) and the maximum acceleration range ($G_{MML}$-$G_{MMH}$) in the correlation map A is designated as a region for discriminating that the object struck is a person (pedestrian). The correlation map A indicates the correlation between the maximum moving speed and the maximum acceleration of the dummy during the vehicle collision. The hatched region in the correlation map A corresponds to the "reference region" of the present invention.

Figure 7:
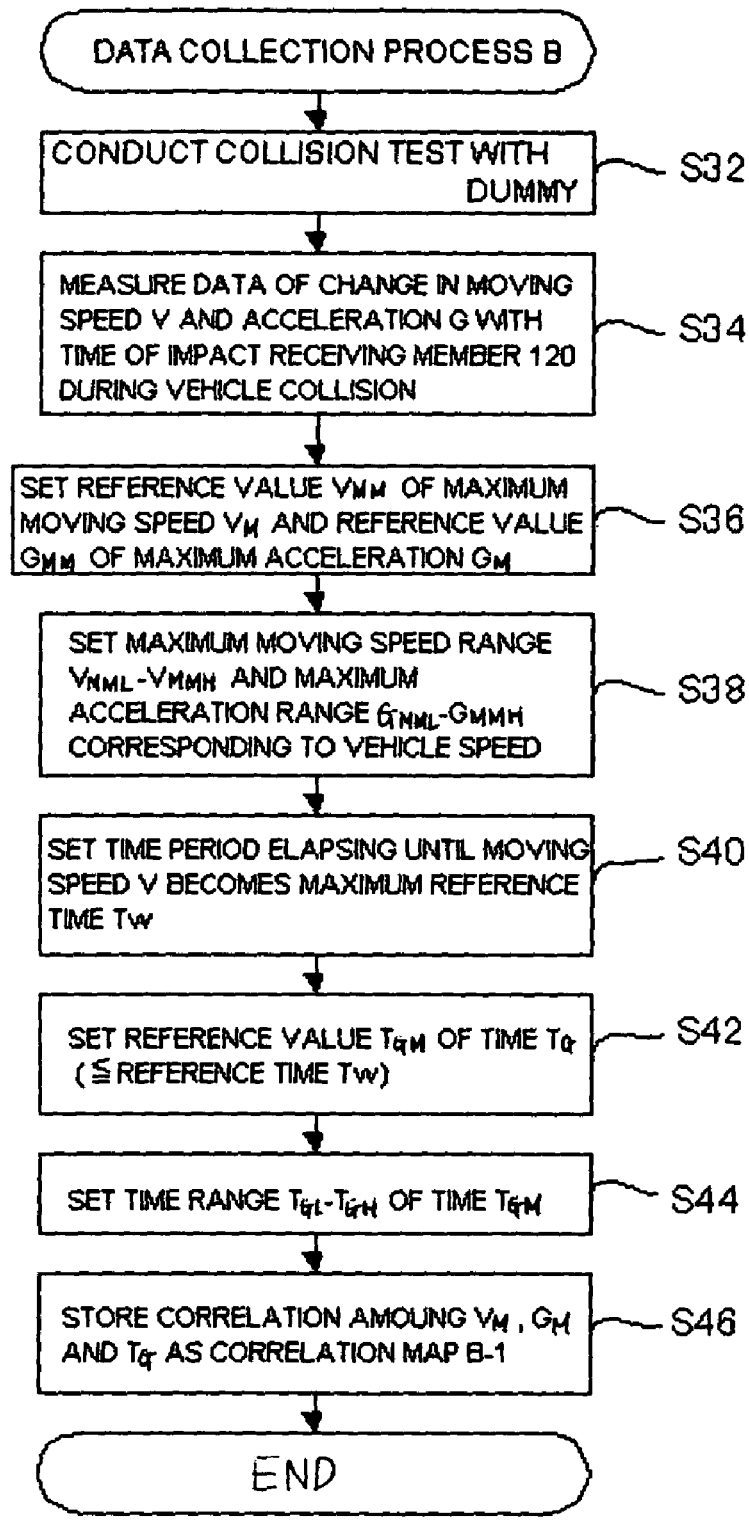
FIG. 7 is a flow chart of "data collection process B" in FIG. 5.

Specifically, the "data collection process B" as designated by Step S30 in FIG. 5 is carried out by sequentially conducting the respective steps (Steps S32 through 46) of the flow chart shown in FIG. 7.

First, by Step S32 in FIG. 7, a vehicle collision test is conducted similarly to Step S12 in FIG. 6. By Step S34 in FIG. 7, data of change in moving speed V and acceleration G with time of the impact receiving member 120 during the vehicle collision are measured. In Step S36 and Step S38 in FIG. 7, the same processes as those in Step S16 and Step S18 in FIG. 6 are conducted. That is, by Step 36 in FIG. 7, a maximum moving speed $V_M$ of the dummy in the vehicle collision test is obtained and a reference value $V_{MM}$ is set based on the maximum moving speed $V_M$, while a maximum acceleration $G_M$ of the dummy in the vehicle collision test is obtained and a reference value $G_{MM}$ is set based on the maximum acceleration $G_M$. By Step 38 in FIG. 7, a maximum moving speed range ($V_{MML}$-$V_{MMH}$) and a maximum acceleration range ($G_{MML}$-$G_{MMH}$) corresponding to the vehicle speed are set. Then, by Step S40 in FIG. 7, a time elapsed until the moving speed V of the impact receiving member 120 becomes the maximum is set as a reference time $T_W$. Successively, by Step S42 in FIG. 7, a reference value $T_{GM}$ of a time $T_G$ is set, wherein the time $T_G$ is shorter than the reference time $T_W$ and is defined as a time period elapsing until the acceleration G of the impact receiving member 120 becomes the maximum. By Step S44 in FIG. 7, a time range ($T_{GL}$-$T_{GH}$) of the time $T_{GM}$ set in Step S42 is set. At this point, the time $T_{GL}$ defining one end of the time range corresponds to a time when the maximum moving speed becomes $V_{MMH}$ and the maximum acceleration becomes $G_{MMH}$, while the time $T_{GH}$ defining the other end of the time range corresponds to a time when the maximum moving speed becomes $V_{MML}$ and the maximum acceleration becomes $G_{MML}$. In Step S46 in FIG. 7, a correlation map B-1 indicating the correlation among the maximum moving speed $V_M$, the maximum acceleration $G_M$, and the time $T_G$ is obtained based on the respective collected data set in the aforementioned Steps S36 through S44 and is stored.

Figure 11:
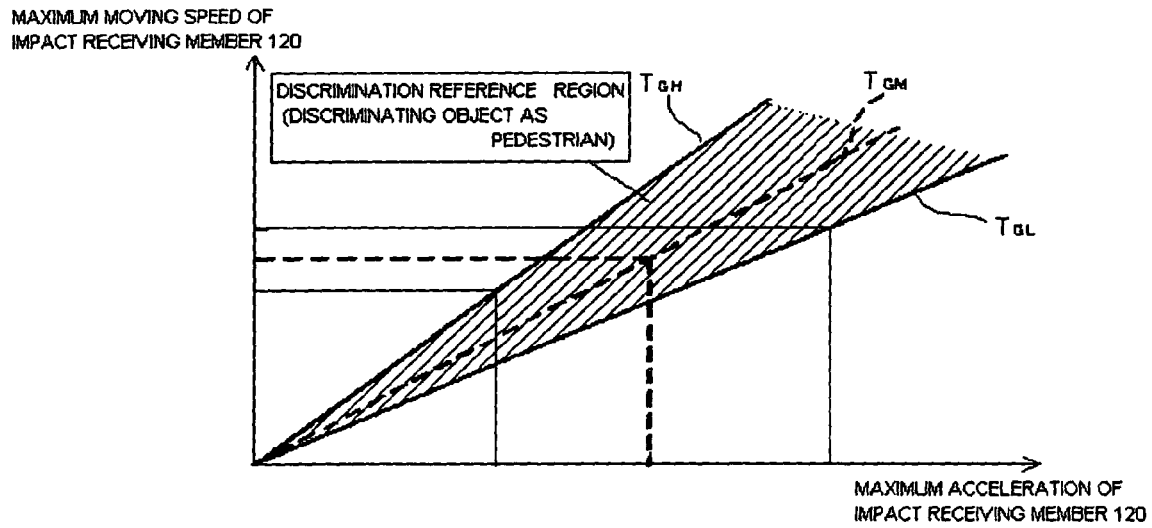
FIG. 11 shows a correlation map B-1 obtained in the "data collection process B".

FIG. 11 shows an example of the correlation map B-1 obtained and stored in the aforementioned Step 46. As shown in FIG. 11, in this embodiment, a region (hatched region in FIG. 11) defined by the time range ($T_{GL}$-$T_{GH}$) is designated as a region for discriminating that the object struck is a person (pedestrian). The correlation map B-1 indicates the correlation among the maximum moving speed and the maximum acceleration of the dummy during the vehicle collision and the elapsed time from the occurrence of the vehicle collision. The hatched region in the correlation map B-1 corresponds to the "reference region" of the present invention.

Figure 12:
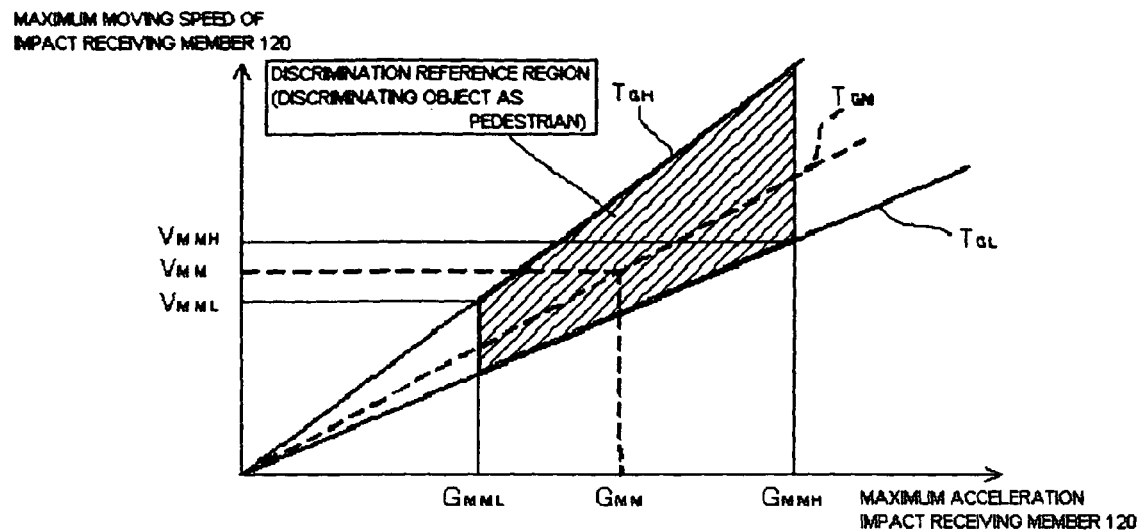
FIG. 12 shows a correlation map B-2 obtained in the "data collection process B".
Figure 13:
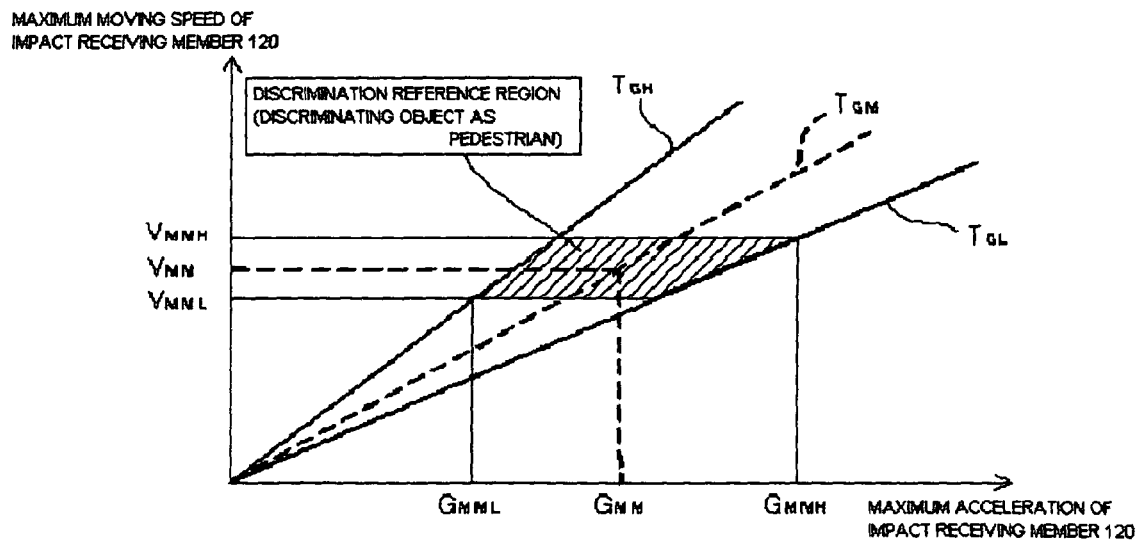
FIG. 13 shows a correlation map B-3 obtained in the "data collection process B".

In the present invention, a correlation map B-2 shown in FIG. 12 or a correlation map B-3 shown in FIG. 13 may be employed instead of the correlation map B-1 in FIG. 11 to be stored in the aforementioned Step S46.

First as for the correlation map B-2 in FIG. 12, a region (hatched region in FIG. 12) satisfying both of the region defined by the maximum acceleration range ($G_{MML}$-$G_{MMH}$) and the region defined by the time range ($T_{GL}$-$T_{GH}$) is designated as a region for discriminating that the object struck is a person (pedestrian). As for the correlation map B-3, a region (hatched region in FIG. 13) satisfying all of the region defined by the maximum moving speed range ($V_{MML}$-$V_{MMH}$), the region defined by the maximum acceleration range ($G_{MML}$-$G_{MMH}$), and the region defined by the time range ($T_{GL}$-$T_{GH}$) is designated as a region for discriminating that the object struck is a person (pedestrian). These correlation maps B-2 and B-3 indicate the correlation among the maximum moving speed and the maximum acceleration of the dummy during the vehicle collision and the elapsed time from the occurrence of the vehicle collision. The hatched region in each of the correlation maps B-2 and B-3 corresponds to the "reference region" of the present invention. As for the correlation maps B1, B-2, and B-3, the hatched region of the correlation map B-2 is smaller than that of the correlation map B-1 and the hatched region of the correlation map B-3 is further smaller than that of the correlation map B-2. Therefore, when the correlation map B-3 is employed, the highest reliability of discrimination of whether the object struck is a person or not is obtained.

Figure 8:
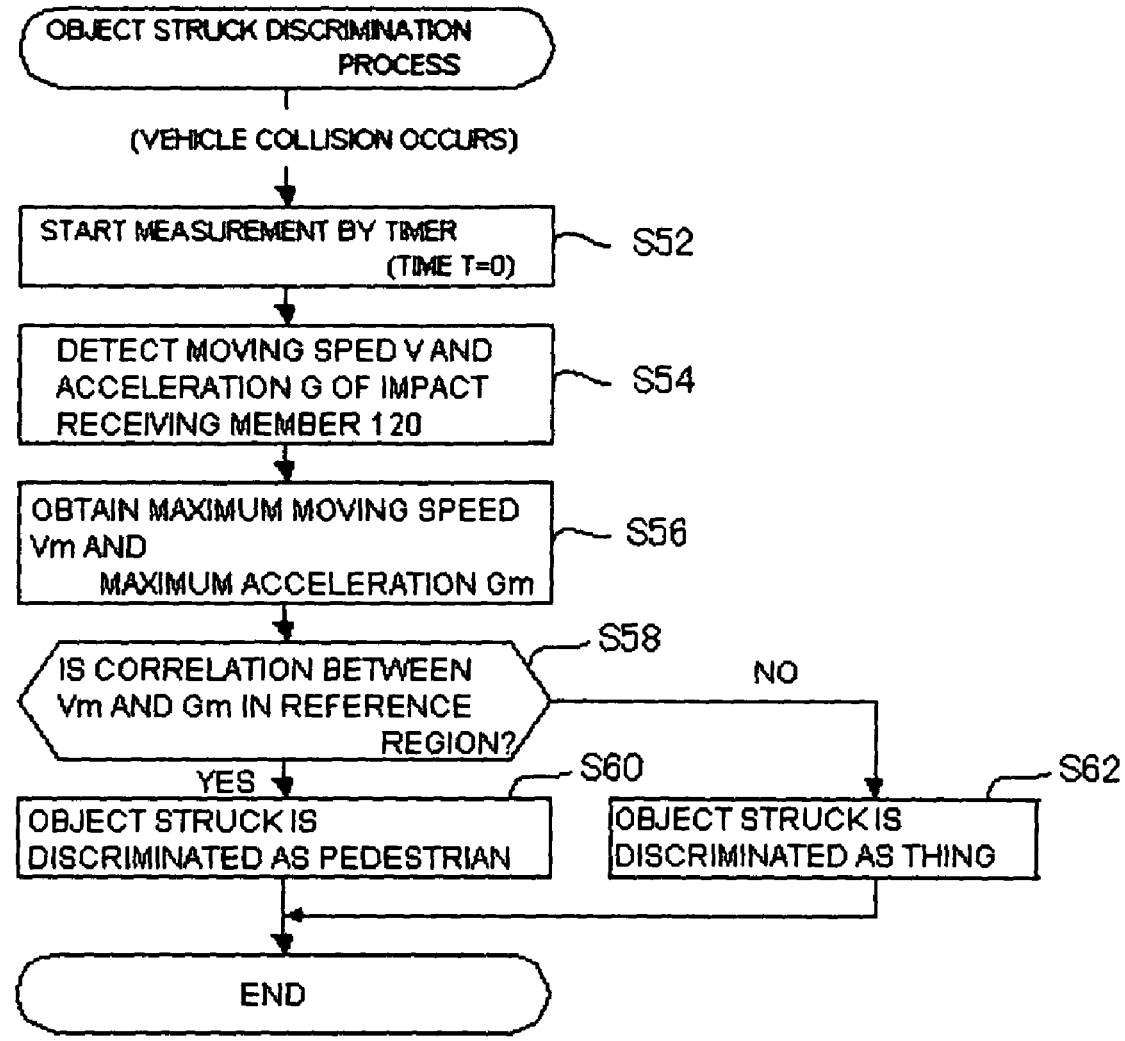
FIG. 8 is a flow chart of "object struck discrimination process" in FIG. 5.

Specifically, the "object struck discrimination process" as designated by Step S50 in FIG. 5 is carried out by sequentially conducting the respective steps (Steps S52-S62) of the flow chart shown in FIG. 8.

First, by Step S52 in FIG. 8, measurement by a timer is started at the occurrence of the vehicle collision. The time T (elapsed time) at the occurrence of the vehicle collision is set as 0 (zero). It should be noted that the occurrence of the vehicle collision is detected by an acceleration sensor capable of detecting acceleration acting on the vehicle in three axial directions (X-axis, Y-axis, Z-axis). Next, by Step S54 in FIG. 8, the actual moving speed V and the actual acceleration G of the impact receiving member 120 during the vehicle collision are detected. To detect the moving speed V and the acceleration G, a speed sensor of known structure and an acceleration sensor of known structure are used as a detection sensor 130. Then, by Step S56 in FIG. 8, the maximum moving speed $V_M$ and the maximum acceleration $G_M$ of the impact receiving member 120 are obtained based on the moving speed V and the acceleration G detected in Step 54. In Step S58, Step S60, and Step S62 in FIG. 8, discrimination of the object struck is conducted based on the correlation map A previously stored by Step S20 in FIG. 6 or the correlation map B-1 (alternatively, the correlation map B-2 or the correlation map B-3) previously stored by Step S46 in FIG. 7. That is, in Step S58, it is determined whether or not the maximum moving speed $V_M$ and the maximum acceleration $G_M$ obtained by Step S56 are in the reference region (the hatched region in the drawing) of the correlation map A shown in FIG. 10 or the correlation map B-1 shown in FIG. 11 (the correlation map B-2 shown in FIG. 12 or the correlation map B-3 shown in FIG. 13). If it is determined that the maximum moving speed $V_M$ and the maximum acceleration $G_M$ obtained by Step S56 are in the reference region (YES in Step S58), it is discriminated that the object struck is a pedestrian (Step S60). If it is determined that these are not in the reference region (NO in Step S58), it is discriminated that the object struck is a thing (Step S62). As described above, in the "object struck discrimination process" in this embodiment, the actual discrimination of the object struck is conducted according to the determination whether the object struck is a person or not.

Figure 9:
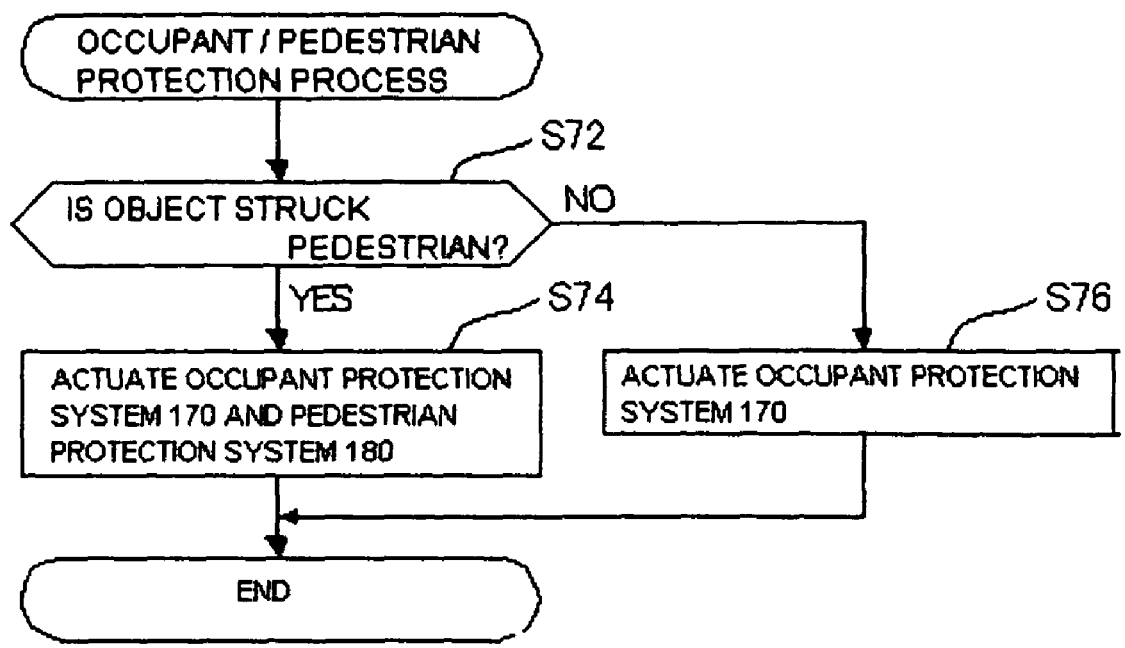
FIG. 9 is a flow chart of "occupant/pedestrian protection process" in FIG. 5.

Specifically, the "occupant/pedestrian protection process" as designated by Step S70 in FIG. 5 is carried out by sequentially conducting the respective steps of the flow chart shown in FIG. 9.

In Step S72 in FIG. 9, based on the result in Step S60 or S62 in FIG. 8, the process proceeds to Step 74 if the object struck is a pedestrian and proceeds to Step 76 if not (the object struck is a thing). In Step S74, an actuation control signal is outputted to the occupant protection system 170 and the pedestrian protection system 180 to actuate the occupant protection system 170 and the pedestrian protection system 180, while in Step S76, an actuation control signal is outputted to the occupant protection system 170 to actuate the occupant protection system 170. When the actuation signal is received, the airbags of the airbag devices composing the occupant protection system 170 are developed and inflated into the occupant protection region, while the pedestrian protection member composing the pedestrian protection system 180 moves toward the pedestrian protection region. Accordingly, thorough protection of the occupant and the pedestrian during the vehicle collision is achieved.

As mentioned above, the occupant protection system 170 and the pedestrian protection system 180 of this embodiment are actuated to protect the occupant and the pedestrian according to the result of discrimination of the object struck during the vehicle collision and correspond to the "protection system" of the present invention. Alternatively, the "protection system" of the present invention may be composed of a combination of the object struck discrimination system 100 with the occupant protection system 170 and the pedestrian protection system 180.

As described above, according to this embodiment, the discrimination of whether the object struck is a person (pedestrian) is made according to the behavior of the impact receiving member 120 during the vehicle collision. Therefore, the accuracy of discrimination of whether the object struck is a person can be increased regardless of the position striking the person on the impact receiving member 120 during the vehicle collision. The result of the discrimination can be used for controlling the pedestrian protection system 180 for providing thorough protection of the person (pedestrian).

In this embodiment, it is discriminated that the object struck is a person if the correlation among the maximum moving speed $V_M$ and the maximum acceleration $G_M$ of the impact receiving member detected during the actual vehicle collision and the elapsed time $T_G$ from the occurrence of the vehicle collision to a time at which the acceleration acting on the dummy becomes the maximum is in the reference region obtained by the vehicle collision test previously conducted. Therefore, the reliability of discrimination of whether the object struck is a person can be increased. Higher reliability than that of a case using the correlation map A according to the "data collection process A" can be obtained by using the correlation map B-1 (the correlation map B-2 or the correlation map B-3) according to the "data collection process B".

Among the correlation maps B-1, B-2, and B-3, the highest reliability can be obtained by using the correlation map B-3.

According to this embodiment, it is possible to conducting the quick discrimination of an object struck within a time period shorter than the reference elapsed time $T_W$. Since the reference elapsed time $T_W$ is set according to the vehicle collision test previously conducted with a dummy, increased reliability of discriminating that the object struck is a person is obtained. The result of the discrimination can be used for controlling the pedestrian protection system 180 for providing thorough protection of the person (pedestrian). The structure capable of conducting the quick discrimination of the object struck allows relatively slow action of the occupant protection system 170. For example, low-capacity inflators for the airbag devices composing the occupant protection system 170 can be used. In addition, it is possible to control the internal pressure of the airbags and/or the winding amount of a pretensioner according to the severity of the vehicle collision.

Further, according to this embodiment, the impact received by the impact receiving member 120 having high rigidity during the vehicle collision reflects the entirety of the impact receiving member 120. Therefore, the discrimination accuracy for discriminating the object struck can be increased regardless of the position striking the object on the impact receiving portion extending in the vehicle width direction.

Further, according to this embodiment, the second absorbing member 150 is disposed to extend frontward beyond the impact receiving member 120, the impact acting on the vehicle body is uniformly applied to the impact receiving member 120 in the dispersed state. Therefore, the vehicle collision can securely reflect to the behavior of the impact receiving member 120, thereby further increasing the discrimination accuracy for discriminating the object struck.

The present invention is not limited to the aforementioned embodiment and various applications and modifications may be made. For example, the following respective embodiments based on the aforementioned embodiment may be carried out.

Though the aforementioned embodiment has been described with regard to the structure that the detection sensor 130 is provided on the rear side of the impact receiving member 120 to detect the behavior of the impact receiving member 120 during the vehicle collision, the detection sensor 130 may be provided on the bumper cover 110b extending lengthwise along the vehicle width similarly to the impact receiving member 120 so as to detect the behavior of the bumper cover 110b during the vehicle collision in the present invention.

Figure 14:
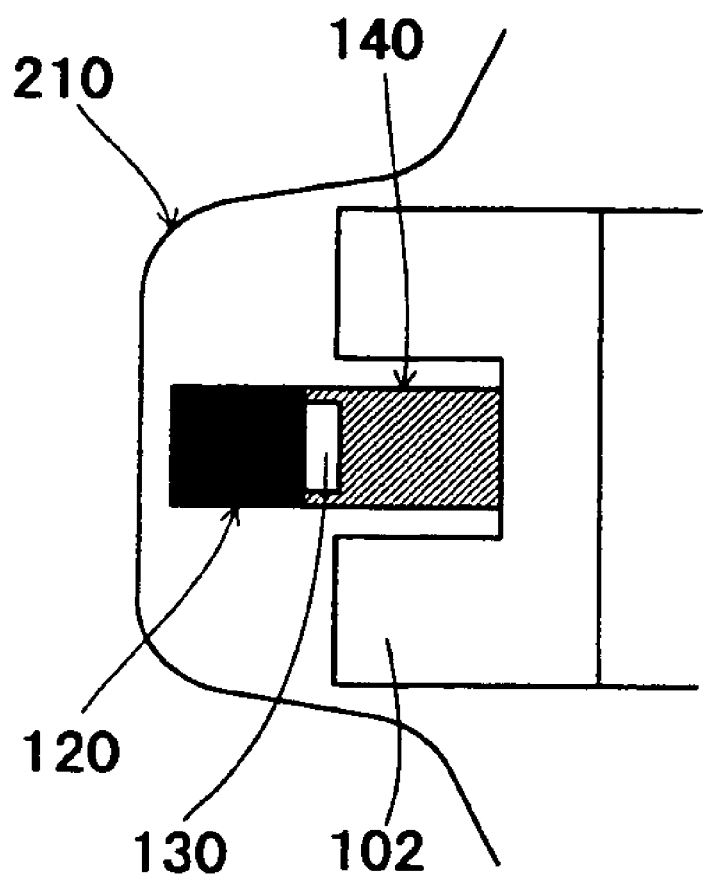
FIG. 14 shows a sectional structure of a front bumper in another embodiment.

Though the aforementioned embodiment has been described with regard to a case that the structure of the front bumper 110 as shown in FIG. 2 is used, a front bumper 210 in which no second absorbing member 150 is disposed between the bumper cover and the frame 102 as shown in FIG. 14 may be employed in the present invention.

Though the aforementioned embodiment has been described with regard to a case of actually discriminating an object struck based on the discrimination of whether the object struck is a person or the like, it can be structured to directly discriminate whether the object struck is a person or a specific object in the present invention.

Though the aforementioned embodiment has been described with regard to a case of discriminating an object struck in a frontal collision of a vehicle, the present invention can be adopted to a technology for discriminating an object struck in a retral collision of a vehicle.

Though the aforementioned embodiment has been described with regard to a case of collecting data by conducting a vehicle collision test with a dummy, data may be collected by conducting a collision simulation on the assumption of a situation with a person.

In the aforementioned embodiment, the maximum moving speed is derived based on the detected information of the moving speed of the impact receiving member 120 and the maximum acceleration is derived based on the detected information of the acceleration of the impact receiving member 120. According to the present invention, however, for deriving the maximum moving speed and the maximum acceleration, at least one of the moving speed and the acceleration may be detected so that at least one of the speed sensor and the acceleration sensor is used to detect the moving speed or the acceleration. Specifically, in a structure in which the detection sensor detects only the moving speed, the maximum moving speed is obtained from the moving speed detected, while the maximum acceleration is derived from rate-of-change in the moving speed per unit time which is derived by differentiating the moving speed detected. Alternatively, in a structure in which the detection sensor detects only the acceleration, the moving speed is derived by integrating the acceleration detected, while the maximum acceleration is derived from the acceleration detected.

Though the aforementioned embodiment has been described with regard to the structure of the object struck discrimination system to be installed in an automobile, the present invention can be adopted to a wide variety of vehicles other than automobile such as train, boat and ship.

What is claimed is:

1. A vehicle protection system comprising:
    at least one pedestrian protection device for being actuated to protect a pedestrian struck by a vehicle;
    at least one occupant protection device for being actuated to protect an occupant during a vehicle collision;
    an elongate bumper assembly for being mounted to extend laterally across a vehicle;
    an outer bumper cover of the bumper assembly;
    a bumper frame behind the bumper cover;
    an elongate high rigidity impact receiving member extending laterally behind the bumper cover and being spaced from the from the bumper frame to allow the elongate high rigidity impact receiving member to move substantially uniformly across the lateral width thereof and relative to the bumper frame upon impact with an object;
    a laterally extending gap between the bumper cover and the high rigidity impact receiving member;
    a sensor that detects one or more parameters of the high rigidity impact receiving member upon impact with an object with the sensor being mounted behind the impact receiving member;
    a low rigidity impact absorbing member mounted to and behind the bumper cover and being of a lower rigidity than the impact receiving member to absorb and disperse the impact forces to act substantially uniformly on the laterally extending, high rigidity impact receiving member for accurate sensing of parameters by the sensor;
    a second low rigidity impact absorbing member mounted between the impact receiving member and the vehicle to allow movement from the impact receiving member toward the vehicle; and
    a controller for receiving input from the sensor and determining whether the object struck by the vehicle is a pedestrian based on the sensor input, the controller actuating both the pedestrian and occupant protection devices if the object is determined to be a pedestrian and only the occupant protection device if the object is determined to be other than a pedestrian.

2. The vehicle protection system of claim 1, wherein the one or more parameters detected by the sensor include at least one of the speed and acceleration of the impact receiving member.

3. The vehicle protection system of claim 1 wherein the controller has previously stored data that is compared to the sensor input for determining whether the struck object is a pedestrian.

4. The vehicle protection system of claim 3 wherein the previously stored data is compiled from vehicle collision tests.

5. The discrimination system of claim 1, further comprising:
a second sensor for detecting the one or more parameters of the high rigidity impact receiving member upon impact with an object, the sensors being mounted to the impact receiving member and being laterally spaced from each other behind the impact receiving member.

* * * * *

UNITED STATES PATENT AND TRADEMARK OFFICE
CERTIFICATE OF CORRECTION

| | | |
|---|---|---|
| PATENT NO. | : 7,734,393 B2 | Page 1 of 1 |
| APPLICATION NO. | : 11/217990 | |
| DATED | : June 8, 2010 | |
| INVENTOR(S) | : Daisuke Murakami et al. | |

It is certified that error appears in the above-identified patent and that said Letters Patent is hereby corrected as shown below:

In the Claims

Claim 1, Column 12, Line 41, delete "from the" before "bumper".

Signed and Sealed this

Twenty-fourth Day of August, 2010

David J. Kappos
*Director of the United States Patent and Trademark Office*